(12) United States Patent
Pasquale et al.

(10) Patent No.: US 9,491,407 B2
(45) Date of Patent: Nov. 8, 2016

(54) METHOD AND SYSTEM FOR INTEGRATING SMART TAGS INTO A VIDEO DATA SERVICE

(75) Inventors: Thad Pasquale, Austin, TX (US); Kurt Joseph, Austin, TX (US); Marc Sullivan, Austin, TX (US); Philip Kortum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 747 days.

(21) Appl. No.: 11/333,067

(22) Filed: Jan. 17, 2006

(65) Prior Publication Data

US 2007/0169155 A1    Jul. 19, 2007

(51) Int. Cl.

| | |
|---|---|
| *G06F 3/00* | (2006.01) |
| *G06F 13/00* | (2006.01) |
| *H04N 5/445* | (2011.01) |
| *H04N 7/16* | (2011.01) |
| *H04N 21/235* | (2011.01) |
| *H04N 21/254* | (2011.01) |
| *H04N 21/258* | (2011.01) |
| *H04N 21/435* | (2011.01) |
| *H04N 21/443* | (2011.01) |
| *H04N 21/4784* | (2011.01) |
| *H04N 21/488* | (2011.01) |
| *H04N 21/61* | (2011.01) |
| *H04N 21/643* | (2011.01) |
| *H04N 21/81* | (2011.01) |
| *H04N 21/845* | (2011.01) |
| *H04N 21/478* | (2011.01) |

(52) U.S. Cl.
CPC .......... *H04N 7/163* (2013.01); *H04N 5/44591* (2013.01); *H04N 21/235* (2013.01); *H04N 21/2542* (2013.01); *H04N 21/25891* (2013.01); *H04N 21/435* (2013.01); *H04N 21/443* (2013.01); *H04N 21/4784* (2013.01); *H04N 21/4882* (2013.01); *H04N 21/6125* (2013.01); *H04N 21/64322* (2013.01); *H04N 21/812* (2013.01); *H04N 21/8133* (2013.01); *H04N 21/8166* (2013.01); *H04N 21/8455* (2013.01); *H04N 21/478* (2013.01)

(58) Field of Classification Search
CPC .......... H04N 21/235; H04N 21/2542; H04N 21/25891; H04N 21/435; H04N 21/443; H04N 21/478; H04N 21/4784; H04N 21/4882; H04N 21/6125; H04N 21/64322; H04N 21/812; H04N 21/8133; H04N 21/8166; H04N 21/8455
USPC ......................................................... 725/81
See application file for complete search history.

(56) References Cited

U.S. PATENT DOCUMENTS

| | | |
|---|---|---|
| 5,109,482 A | 4/1992 | Bohrman |
| 5,442,390 A | 8/1995 | Hooper et al. |
| 5,539,871 A | 7/1996 | Gibson |

(Continued)

*Primary Examiner* — Joshua Taylor
(74) *Attorney, Agent, or Firm* — Jackson Walker L.L.P.

(57) ABSTRACT

A set of application program interfaces is embodied on a computer readable medium for execution on a computer in conjunction with an application program that integrates smart tags related to a video program with a payload of video data packets. A first interface receives an input from a tag database related to video program content. A second interface receives an input integrating a smart tag with a video data payload packet. A third interface receives an input providing integrated smart tag and video data to a network. Another interface receives an input from a customer segmentation database, for example for targeting information to specific customers or customer groups.

20 Claims, 6 Drawing Sheets

(56) References Cited

U.S. PATENT DOCUMENTS

| | | | |
|---|---|---|---|
| 5,596,705 A | 1/1997 | Reimer et al. | |
| 5,708,845 A | 1/1998 | Wistendahl et al. | |
| 5,920,572 A * | 7/1999 | Washington et al. | 370/535 |
| 5,929,849 A * | 7/1999 | Kikinis | 725/113 |
| 6,018,768 A * | 1/2000 | Ullman et al. | 709/218 |
| 6,490,580 B1 | 12/2002 | Dey et al. | |
| 6,785,733 B1 * | 8/2004 | Mimura et al. | 709/236 |
| 7,367,042 B1 * | 4/2008 | Dakss et al. | 725/60 |
| 2005/0160469 A1 | 7/2005 | Chiu et al. | |
| 2005/0280540 A1 | 12/2005 | Muehl et al. | |
| 2006/0136980 A1 * | 6/2006 | Fulcher et al. | 725/134 |
| 2008/0151881 A1 * | 6/2008 | Liu et al. | 370/389 |

* cited by examiner

METHOD AND SYSTEM FOR INTEGRATING SMART TAGS INTO A VIDEO DATA SERVICE

BACKGROUND OF THE DISCLOSURE

1. Field of the Disclosure

The present disclosure relates in general to the field of interactively vending items through a video communication link.

2. Description of the Related Art

The ability to purchase items via television or other display devices is often limited to television shopping networks which direct customers to the phone or the internet to complete a transaction. Interactive TV and business conducted by means of interactive television, "T" commerce have not reached broad market adoption. Many companies do strategically place products in television shows and movies but the ability to purchase an item is delayed until the consumer chooses to 'shop' for the item.

Television advertisements can be intrusive and annoying to viewers. This is exemplified by the market adoption of "TiVo" like devices which allow users to bypass viewing the commercials. Viewers bypassing advertising means that advertising resources are used ineffectively.

There is a need for a marketing system that does not rely on advertising that inconveniently and arbitrarily interrupts the viewer experience. There is a need to allow viewers better access to products and information related to programming content rather than obtrusive commercials.

BRIEF DESCRIPTION OF THE FIGURES

For detailed understanding of the present disclosure, references should be made to the following detailed description of an exemplary embodiment, taken in conjunction with the accompanying drawings, wherein.

DETAILED DESCRIPTION OF THE PREFERRED EMBODIMENT

In view of the above, the present disclosure through one or more of its various aspects and/or embodiments is presented to provide one or more advantages, such as those noted below. The present invention provides for obtaining product specific information, interacting with available information and vending products or services related to smart tags that are displayed with video streams. The invention provides for interactively choosing smart tag related objects or subjects in a data stream, objects that may be related to items in the underlying video presentation.

This invention embodies a system, apparatus and method to allow broadcasters of content providers to insert "smart tags" into the actual packet content of an underlying video programming. The underlying video program is the original program content separate from any smart tag associated data. Smart tags enable viewers to learn about products or services that may be associated with objects or subjects in the underlying video program. For example, a beverage vendor may choose to integrate a smart tag into a video stream during the time their beverage appears with the video program, wherein the smart tag alerts the viewer that further products or services are available by interacting with the viewer's display system.

Smart tag interaction with display equipment provides alerts and facilitates viewer interactivity with and about available products and services users may acquire as underlying video programs are in progress. Smart tags, smart tag display and user interaction resulting from smart tags maybe independent of the underlying video content and/or whether or not a commercial advertisement is being displayed. For example, with the advent of Internet Protocol Television (IPTV), it becomes possible to insert these tags into the data stream of the actual content since all of the content will be digital in nature. These tags provide the viewer with opportunities to interact with that content related to the underlying video stream as well as further products and services made available as a result of initiating the contact.

Displaying of the smart tag on a particular display device may be based on rules present in or otherwise associated with an end-user display device. For example some users or user-groups may request or deny type or classes or products and services. Smart tags may be targeted to particular users and filters may be set to cause initiation or suppression of smart tag enabled display equipment.

Figure 1:
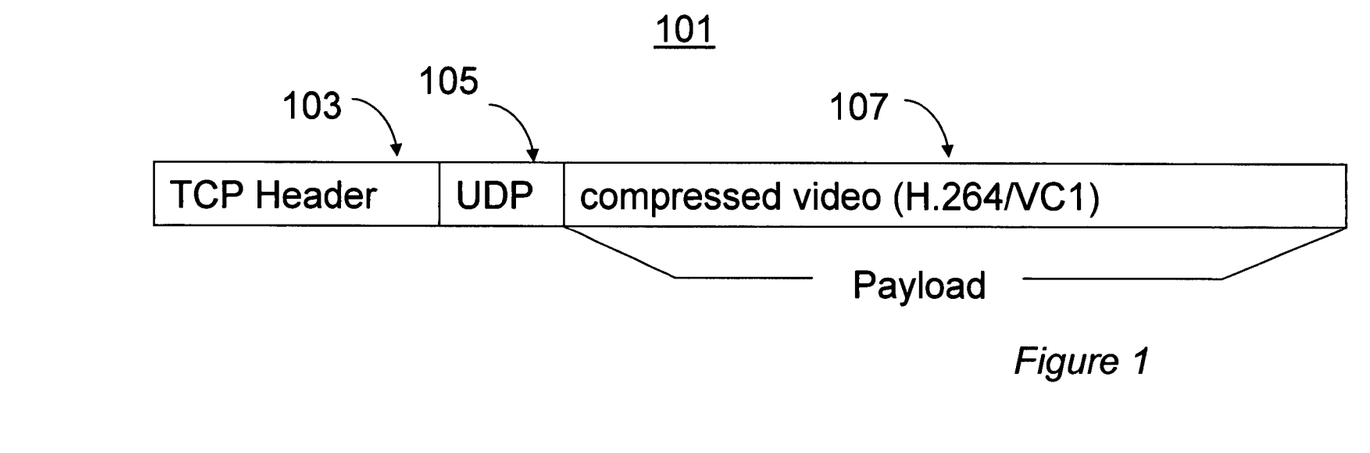
FIG. 1 illustrates a system provided by the present invention.

FIG. 1 illustrates a normal data packet structure 101. A header, for example Transmission Control Protocol (TCP) Header 103 is part of the packet along with User Datagram Protocol (UDP) 105 and the compressed data video payload 107 which for example may be compressed video H.264/VC1.

Figure 2:
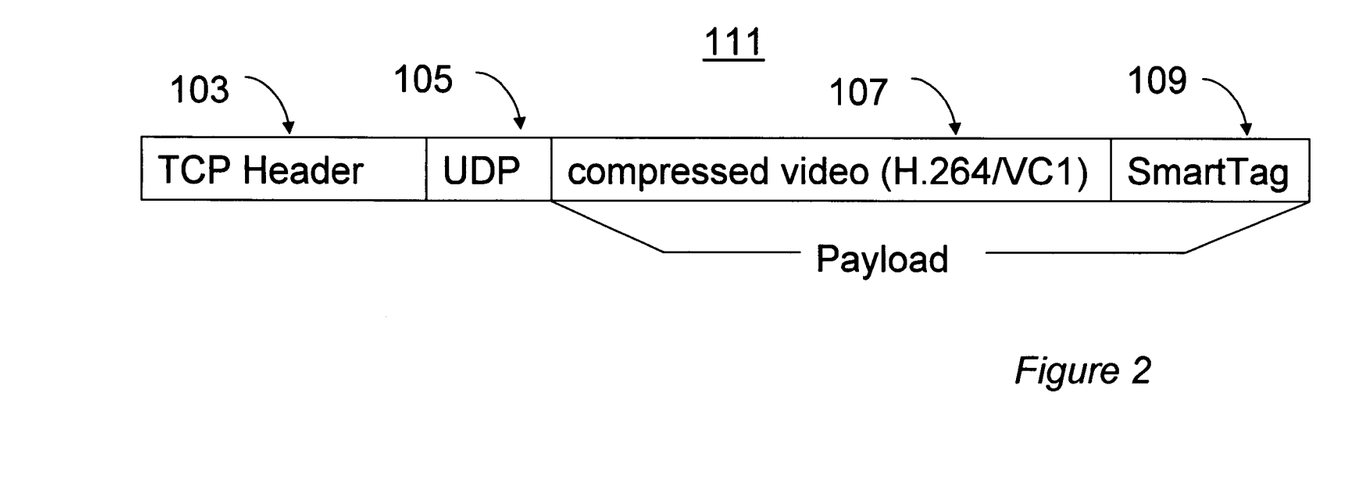
FIG. 2 illustrates a flow chart of a method provided by the present invention.

FIG. 2 illustrates an exemplary data packet structure 111 with a smart tag 109 inserted with the compressed video payload 107. For a single video stream (i.e. movie, show, etc.) most of the packets would have the normal structure and a subset of packets would have the Smart Tag 109 embedded therein. For content copied to a Digital Video Recorder (DVR) or other media, the TCP and UDP headers are stripped off and the data/video payload is written to the storage device in compressed or uncompressed form. For this reason it is helpful to have smart tags to provide ancillary information directly in the video packets.

In one embodiment smart tags may be integrated into the video portion of data packets 101 on a server, which may be termed as an 'integration server.' This server may be any server associated with committing the underlying video program to the video portion of data packets for distribution across a network. A server compressing the data and/or integrating smart tags into the video portion of packets may be located anywhere along the route of the data from an original video source (for example a video production studio) through any distribution channel (like an Internet Service Provider). A server may integrate the smart tag with either compressed or decompressed video data. The video data may be decompressed at customer device, such as a set top box (STB) and the smart tags extracted for display or interaction with associated data.

Figure 3:
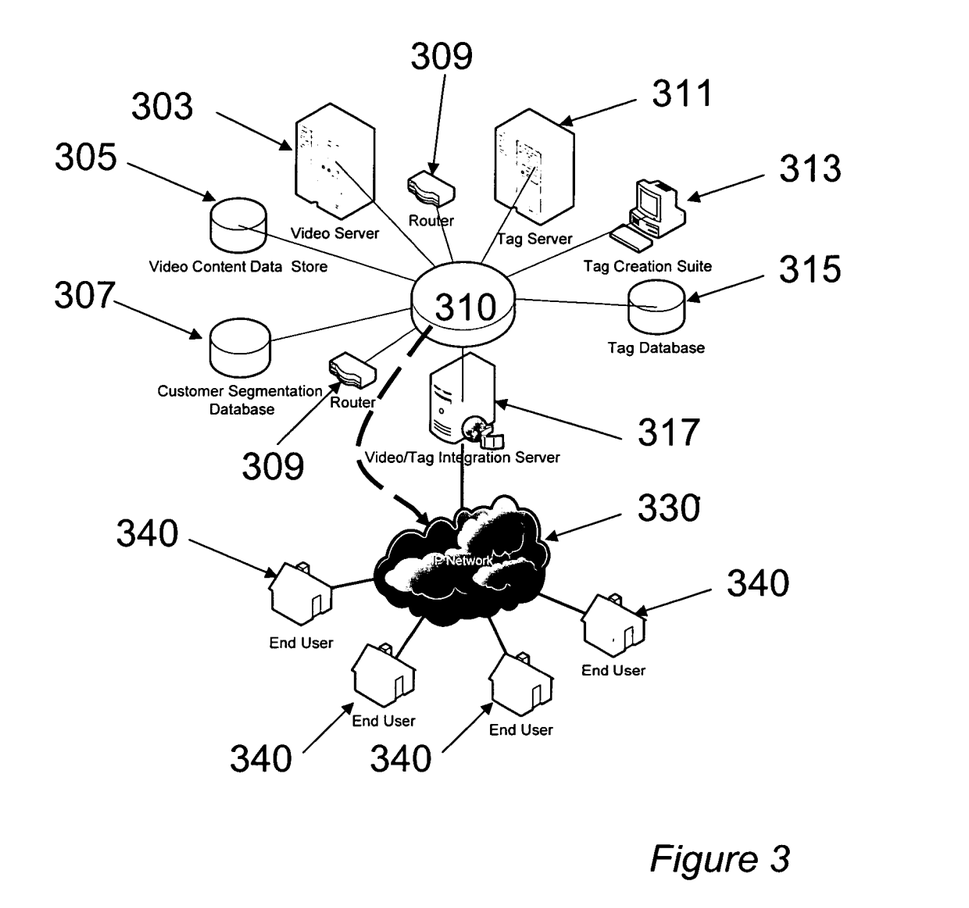
FIG. 3 illustrates an embodiment provided by the present invention.

FIG. 3 is an exemplary high-level depiction of the network components and network relationships involved in delivering the smart tag system to an end-user. Any of the system components may communicate with other components through a network hub 310. A video content data storage 305 includes original video programming content and may be associated with a video server 303. The system has various routers 309 to facilitate communications throughout the network(s).

A tag creation suite 313 may be associated with a Tag Server 311 and a Tag Database 315. Smart Tags may be created using a custom software suite 313 which may contain a user interface to create the tag content associated with a Tag Database 315 and to integrate the tags into the correct locations of the video portions of the data packet stream. The video with smart tag content may be fed into a Video/Tag Integration Server 317 to integrate the content and stream it through the IP network to the end user's set top box (424 in FIG. 4).

Customer information may reside with a Customer Segmentation Database 307. This Database 307 may facilitate filtering information accompanying the smart tags for customer targeting of products and services.

Figure 5:
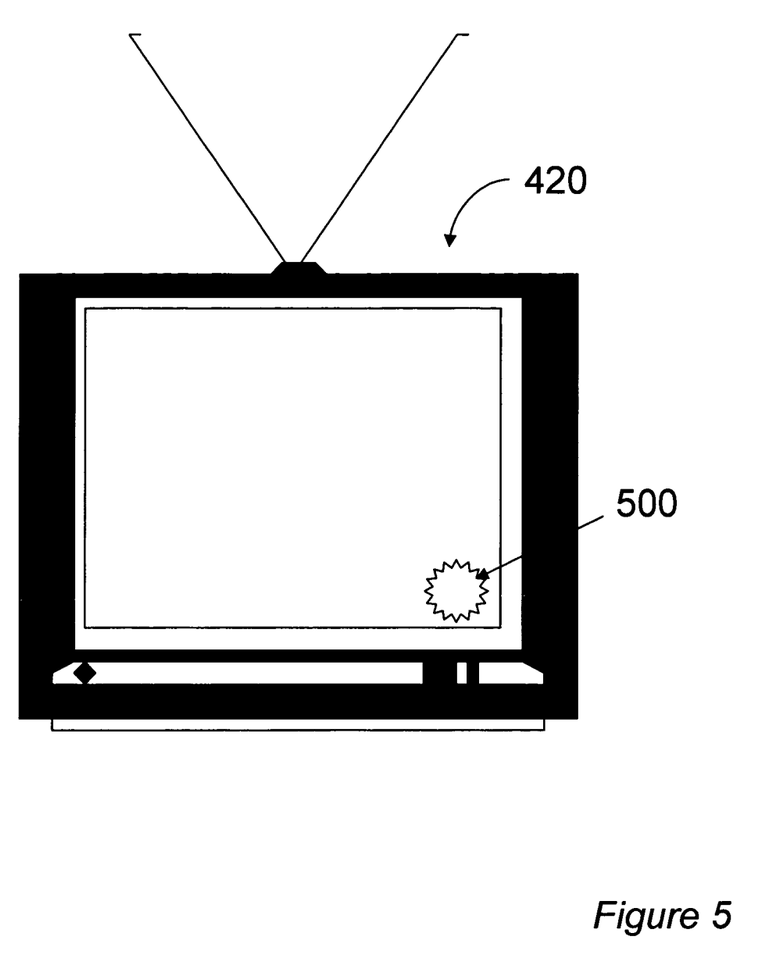
FIG. 5 illustrates a presentation of a smart tag.

A Video/Tag Integration Server 317 integrates smart tags 109 into video portions of the data packets 101 so that the data packets are smart tag integrated data packets 111. After smart tag data are integrated with the video, data packets may be routed over an IP Network 330 to be provided to end users 340. While a network path from hub 310 to Video/Tag Integration Server 317 and then with IP Network 330 is illustrated in FIG. 5, it will be appreciated that network access from the hub 310 to the IP Network 330 may be direct, as illustrated by the dashed line connecting 310 with 330.

Smart Tags may be created using a custom software suite which may contain a user interface to create the tag content and to integrate the tags into the correct locations of the video portions of the data packet stream. The video with smart tag content may be fed into an integration server to integrate the content and stream it through the IP network to the end user's set top box.

Figure 4:
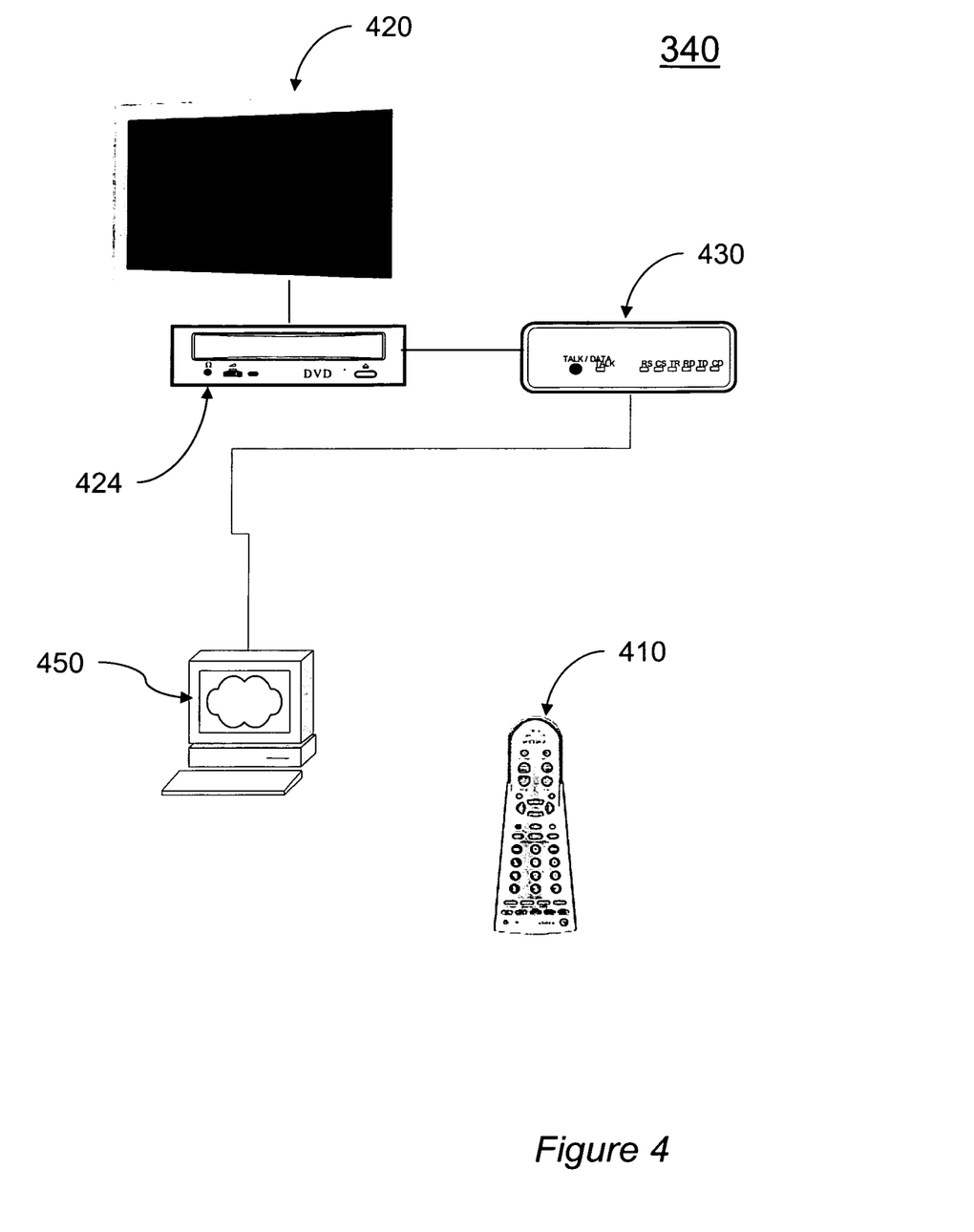
FIG. 4 illustrates a system provided by the present invention.

FIG. 4 further illustrates the end user environment 340. After the receipt of packet data 111 from the IP Network 330 the data may go through a gateway 450 and then to a router 430. An STB 424 checks the data packets 111 for the presence of smart tags 109 and then provides a display signifying the presence of a smart tag on a display device 420. A remote control 410 or other system interaction device may be used to respond to the presence of Smart Tags and initiate further interaction by a user. While the remote control is one implementation of a 'smart' device that will interact and receive information associated with a Smart Tag, a keyboard or other input device may be used to respond to the presence of Smart Tags.

Typically current video distribution media, like DVR technology, allows viewers to skip and pass through the commercial content. Embodiments of smart tags allow program providers, broadcasters and advertisers to market products and services to customers directly within the actual programming content.

Product placement within programming content is an effective method for advertisers to reach consumers. These smart tags associated with the placed products allow the broadcaster to add interactivity to these product placements by allowing for direct consumer interaction with information sources regarding these products. For example, a product placement for clothing or automobiles may be included in a popular prime time television show. A smart tag may accompany this product placement within the video stream, and the system, through the set-top box, would recognize this tag and alert the user. By interacting with the display equipment in response to being alerted by the smart tag display information, the viewer/user requests further information or even engages in product purchasing.

For example the smart tag 109 that accompanies the video 107 interacts with an end user device, such as a set top box (STB). The user may be notified on screen that there is more information concerning the product placement, and they could do any number of actions through the remote and the set top box including but not limited to the following: 1) Obtain more information about the promotion/product. 2) Order the product. 3) Compare the product with other offers. 4) Bookmark the product/offer for viewing at a later time.

In one embodiment the user request initiates a 'browser' that provides further direct interactivity choices such as ordering information so that the user may directly purchase, for example, clothing worn by a person in the underlying video program. In another embodiment smart tags may be used as a marketing tool in how-to or home improvement shows. For example shows using a particular brand/color of paint could offer the insertion of a smart tag to the manufacturer. Viewers may go to that manufacturer's website through the smart tag, and view alternative shades or even send an order for the paint to their local hardware store so it would be ready for pickup at their convenience.

Also, smart tags may be inserted into commercials. Smart tags could be used as an incentive to entice users to watch or interact directly with a commercial. In one embodiment, a sweepstakes could be conducted using smart tags. Because a user may have an STB with a unique ID number (IP or otherwise), advertisers can inform sweepstakes winners through smart tag filtering. In another aspect of this embodiment viewers may watch a promotion/commercial to win or qualify for services or products.

This smart tag information system allows the users to turn various notifications and types of notifications on or off while watching the programming. Users may watch the show and go back and review the promotions or information they may be interested in, or save the tag references as a program is in progress for later follow-up. Advantages include the tags becoming integrated with the content, so the tags are always present and available and can be reviewed at a later time, either separately or in conjunction with the temporally associated underlying video content. Viewers may skip commercials and not go back and view them, even though viewers may have been interested in the particular product or piece of information. Tags associated with a video may be collated or listed for access before, during or after viewing the programming content associated with the underlying video stream. A smart tag menu of all the smart tags in a program may be provided to viewers to facilitate viewer access to the product and services information.

As discussed above, a smart tag allows for direct interaction with information sourced outside of the underlying video stream by customer/viewers via a STB or other end-user device. As the smart tag associated with a product initially interacts with the STB, the STB will cause a representation of the smart tag to appear on the viewer's display device. The viewer may then interact with the smart tag, for example by activating the remote control to obtain more information related to the displayed smart tag.

In one embodiment a smart tag is a data structure embedded within a video stream that may be read by a program residing on an end-user device like an STB. After the STB responds to the presence of a smart tag and then displays a visual representation of the tag, various actions may be taken at the STB level that may include a viewer obtaining more information or initiating purchasing actions. For example, a viewer responding to a displayed smart tag may include an information request going out to a Central Office data store or other online data base to bring more information or content to the viewer/requester. Alternatively, if the smart tag were embedded within a self-contained storage medium, as opposed to being streamed from a CO, the self-contained storage medium (DVD, DVR, other video display programming source/media, etc.) may have a database of products or options to present in response to a request based on a displayed smart tag. For example, a catalogue of clothing goods worn by characters in the underlying program may be accessed from data associated with the video source. Optionally, the information presently retrieved from the self-contained storage medium may lead to initiation of further information retrieval outside of the information directly present with the video source. For example, an online database on the internet or a CO.

Interaction by a viewer with a smart tag can initiate graphical changes on the display device. These graphical changes may be the further display of graphical information which in turn can drive other activity. For example, a separate window may appear that contains a web browser or other interaction facility for obtaining further product information or initiating ordering. Optionally, the underlying video program may be halted while products or services are ordered using a browser type facility, and then the program may be resumed.

In one aspect much of the ordering information usually repetitiously entered during product ordering may be present by virtue of viewer personal information already being associated with an STB. It may only be necessary to alter information specific to the desired information or services.

The smart tag is a data structure embedded within the underlying video that is recognized by a program operating in conjunction with an STB or related display device. The smart tag has a recognizable format identifier such that a program in the STB recognizes, extracts for analysis, then analyzes (for example by comparing with various filters), and may then display. The smart tag is integrated as part of the data, tied to the video stream, and shares a temporal aspect in that it may be displayed at time related to the underlying video.

A smart tag typically is not 'header' data and does not need to be similar to internet style 'metadata.' The temporal aspect of Smart Tags gives them further functionality that header data and metadata do not have. A smart tag also may not be an announcement on top of a video stream that accompanies the images, like program announcements super-imposed on top of regular content. A smart tag may initiate an action by a display device to affect a display on top of an underlying video content.

A smart tag goes to an STB or other display related device to affect initiation of a signal displayed to a viewer that information related to the objects or subjects related to the underlying video is available to the viewer. While only the information to initiate a display alerting the viewer more information is necessarily included in the tag, other data associated in the tag itself may be present. For example the tag itself may contain inherent information signaling the further types of information that may be available should the viewer choose to interact with the system in response to the display initiated by the smart tag. The further information may be included in the tag itself, as well as optionally stored with the underlying video source.

Smart tags may be filtered by a device associated with an STB (or other display device) in a viewer specific way to enable receiving a targeted subset of all the tags present in a video stream. Due to these filters which may be set by the viewer or the content provider, the viewer may receive only the types of smart tags expected, requested, or otherwise allowed. Tags interacting with particular viewers may have associated rules that are tailored to so the tags deliver specially targeted information.

A smart tag may carry a variable amount of information, and the information may be combined with information present in the STB or display associated device. The variable and special targeting aspects of the smart tag give further functionality to the smart tag.

Smart tag information may be included in video data stream content interacting with an STB which then shows up on the screen, for example as an icon signifying there is information available to a viewer/user. The presence of a tag initiated icon signals the user to interact with a device like a remote control to bring up the tag information and/or request for access to further information. The request for further information goes non-exclusively to at least one of: i) the smart tag, ii) a database associated with the video source, iii) an online (internet) database, or a iv) CO. The information may be local in the sense the DVR content has 'smart information' already, meaning a significant further data store that may be accessed by response to a smart tag may be resident with the source for the underlying video program. In another aspect the interactions of user/viewers may be monitored, stored and collected. Smart tags associated with DVR video sources may enable access larger network information resources. For example an advertisement associated with products on a DVR media may be initiated by smart tags. These smart tags may then initiate a further information access request by sending requests over a network to receive current daily beverage promotion specific information. In this way the smart tag associated with a video source may enable retrieval of current information for products and services. Whether the smart tags associated with video content being displayed to a viewer initiate concurrent retrieval of information for further display may be optionally set by the user or the content provider.

The rules and optional settings for an STB or other display associated device to interact with smart tags reside at least in part with software and or firmware in the STB.

As previously discussed the rules may further divide smart tags into subsets enabling selective targeting of customers and customer groups.

A program or subroutine resident in association with a display facility like an STB that 'sees' smart tags in video packets may have several aspects. In one aspect the video data may be received with the smart tag integrated into the video portion of the packet. The smart tag data may then be 'de-integrated' by a STB to extract the information in the smart tag for display. Some of the data may be retained with the program to facilitate further interactivity with data stored in conjunction with the video source or data accessed over an outside network.

FIG. 5 illustrates a presentation of the presence of a Smart Tag. FIG. 5 is a screen shot on a display device 420 that includes a sunburst (circled) Smart Tag presence indicator 500 which could be animated. The display 500 signals the presence of a tag. Tag notifications could be optionally customized by the user in any number of ways (sound, style animation, off/on, etc.). At this point, the user could simply ignore the tag, or store tag as a 'bookmark' and come back to it later if the show was being recorded on a DVR. Or, using the remote control, the user could access a 'tags menu' to view the information associated with any tag, this access may occur during or after a program is viewed if the program is being accessed over a non-local network (i.e., the program is viewed during download). Additionally, the tags may be accessed prior to viewing a program when the program source is locally stored (like on a DVR).

Figure 6:
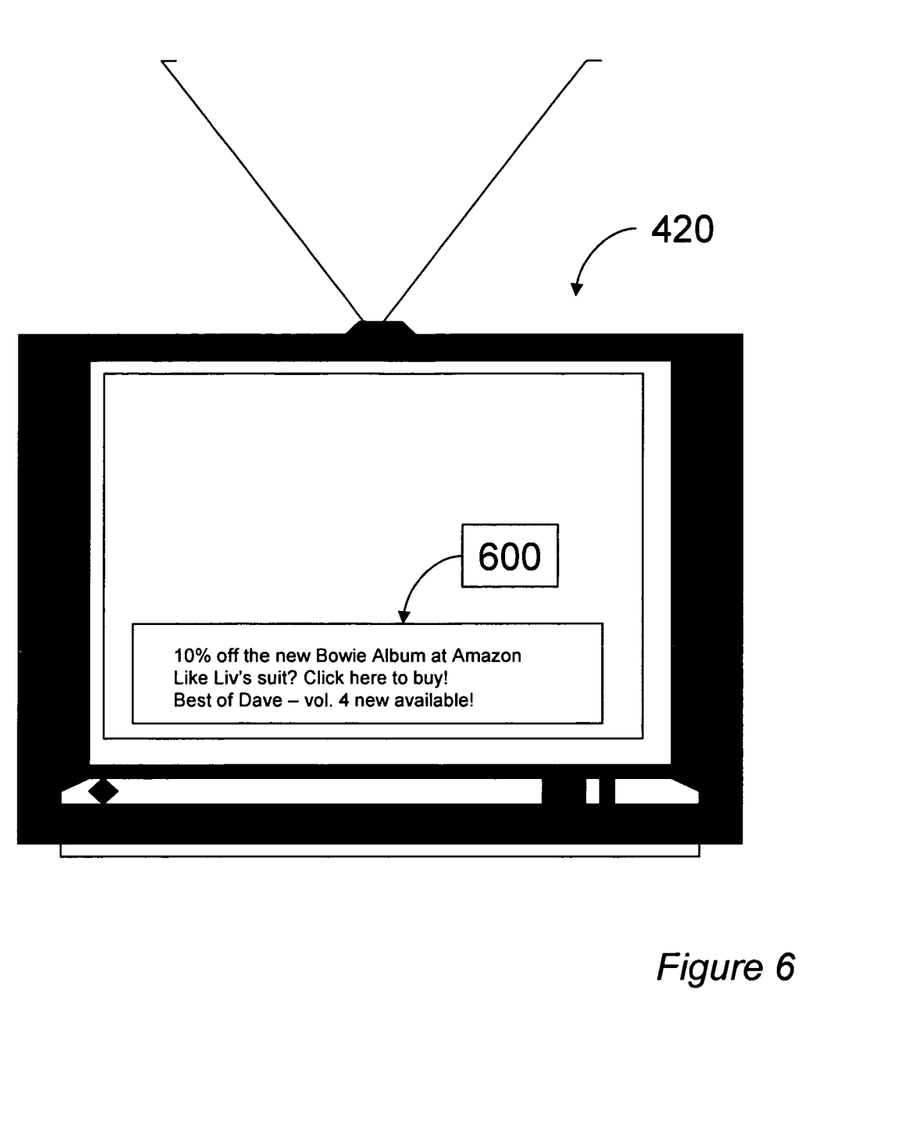
FIG. 6 is an illustration of a type of information provided to a user after the user responds to the presence of a smart tag.

FIG. 6 is an illustration of the information provided to a user after the user responds to the presence of the smart tag. A link for a DVD set ("Best of Dave") and other information is variously highlighted 600. Interactively choosing this link enables more information to be obtained or the product to be ordered. Alternatively, clicking on the links 600, the presence indicator 500, or other prompt may bring the user directly to an input screen providing purchasing options (like an internet connected browser interface). Specific tags target specific customer segmentations so that each customer may receive a customized set of tags based upon preferences or profiles.

In one aspect a set of application program interfaces is embodied on a computer readable medium for execution on a computer in conjunction with an application program that integrates smart tags related to a video program with a payload of video data packets. A first interface receives an input from a tag database related to video program content. A second interface receives an input integrating a smart tag with a video data payload packet. A third interface receives an input providing integrated smart tag and video data to a network. Another interface receives an input from a customer segmentation database, for example for targeting information to specific customers or customer groups. A plurality of smart tags may be temporally related and integrated into the video program. Another interface receives an input for creating smart tags related to the video program content. Still another interface receives an input for providing smart tag related information over a network, wherein an outside request in response to a smart tag initiated request is received over the network. Yet another interface receives input related to information requests from an end-user STB. An application interface may also receive specific STB customer related information, for example, the customer STB may have apriori information available to facilitate ordering or purchasing vendible objects.

In another aspect a system for vending objects related to a video program includes an object information database for vendible objects related to or displayed in a video program. A user-to-processor interface may be included for selecting, on a user display device, a vendible object related to a smart tag associated with the video program. The user-to-processor interface may also be used for enabling a user to request interactive vending options for the vendible object. A processor is configured to initiate a display, on the user display device, wherein the display is related to the presence of the smart tag. A communication network interface may link the processor and the object information database. An object information database may be located with the video program source, for example on a DVD or DVR or other video storage media, whether with or without header and/or UDP information. Alternatively, the object information database may be located with a service provider CO. A smart tag is often most usefully temporally associated with the video program so that smart tags appear concurrently when related objects appear in the video presentation. A smart tag may indicate the availability of specific vending options or that an interactive menu of options for vending objects may be accessed in association with the user display device.

In another embodiment a computer readable medium containing instructions that when executed by a computer perform a computerized method for integrating a smart tag with a video payload portion of a data packet. Video program content is obtained and integrated with a smart tag indicating the presence of information related to objects in the video program, which is in the payload portion of a video stream data packet. The method can include a communication network linking a smart tag database with a video server. The method may also include integrating the smart tags into the video payload portions so that the smart tags are located temporally with objects in the video content. Also, the method may include an interactive menu displayed on the user display device with information related to the user-selected object. Additionally, the method may call for attaching customer segmentation data to the smart tag, which information may be used for enabling targeted information delivery.

Figure 7:
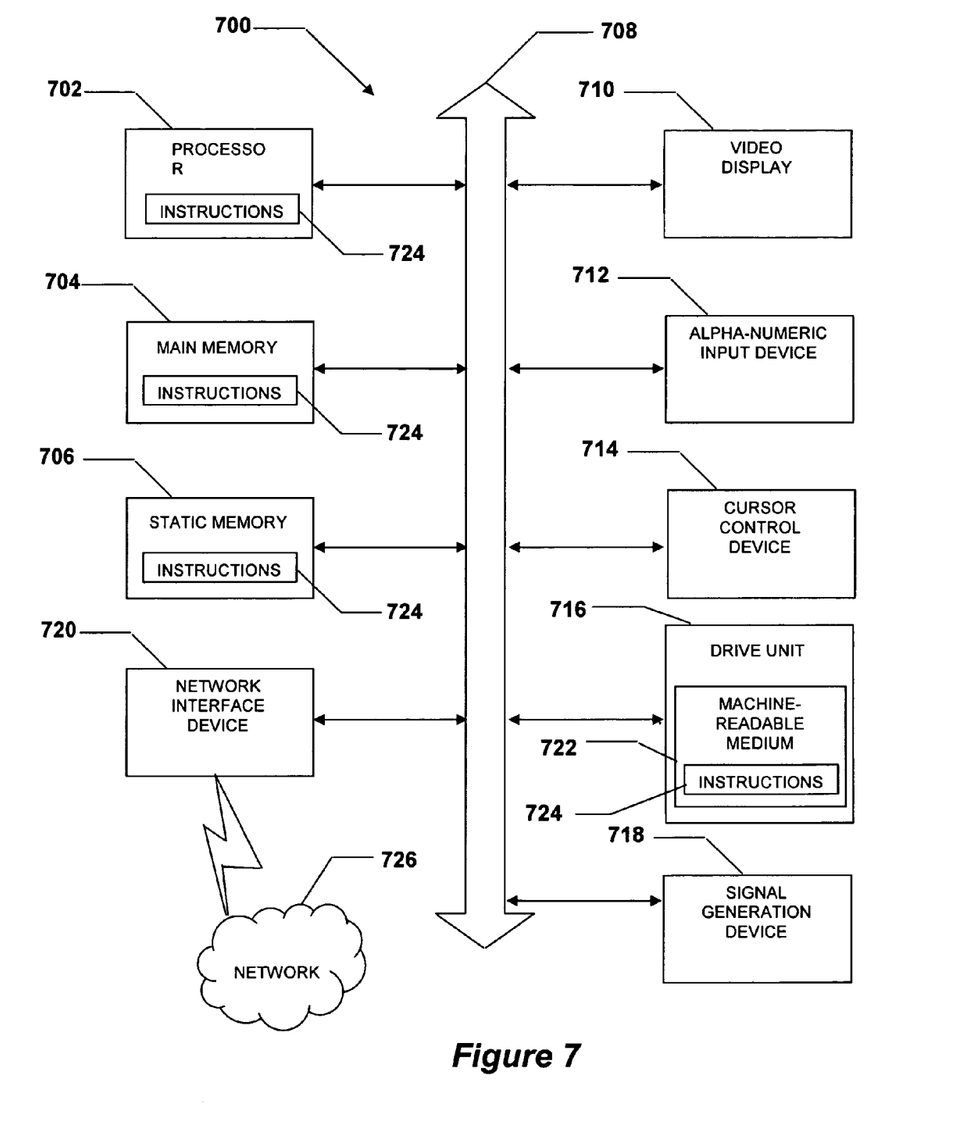
FIG. 7 is a diagrammatic representation of a machine in the form of a computer system that executes one or more functions and methodologies of the present disclosure.

Turning now to FIG. 7, FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network, for example including and not limited to hub 310 and IP Network 330) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine readable medium"should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the illustrative embodiment is considered to include any one or more machine-readable medium listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

What is claimed is:

1. A non-transitory computer readable storage medium, including processor executable program instructions that, when executed by a processor, cause the processor to perform operations comprising:
receiving tag data from a tag database describing a smart tag corresponding to an element of a video program wherein the element is selected from: an object depicted in the video program and a subject raised in the video program;
receiving video data from a video content server corresponding to the video program;
combining the tag data and the video data to generate program data associated with the video program, the program data including at least one integrated user datagram protocol packet comprising a user datagram protocol header and a payload comprising a compressed video transport packet corresponding to a particular portion of the video program and a smart tag corresponding to a particular element occurring during the particular portion of the video program wherein each integrated user data protocol packet payload containing a smart tag further includes a video transport packet corresponding to a particular portion of the video program to which the smart tag corresponds;
transmitting the program data to a plurality of end users via a packet-switched network; and
responsive to detecting viewer selection of a first smart tag associated with a first element of the video program, launching a browser to browse a web page associated with the first element.

2. The computer readable storage medium of claim 1, wherein the first smart tag is associated with a time in the video program.

3. The computer readable storage medium of claim 1, wherein:
the program data includes an indication of a first plurality of end users associated with the first smart tag.

4. The computer readable storage medium of claim 1, wherein the operations include:
receiving a first request from an end user, the request specifying the first smart tag;
in response to the first request, sending a second request to a smart tag server for information associated with the first smart tag;
receiving, in response to the second request, the information associated with the first smart tag; and
sending the information to the end user.

5. The computer readable storage medium of claim 1, wherein the operations include:
halting presentation of the video program in response to the launching of the browser and resuming presentation of the video program when use of the browser ends.

6. The computer readable storage medium of claim 5, wherein the first smart tag includes instructions, executable by an end user device, that when executed by the end user device cause the end user device to perform operations including generating a display element configured to enable the end user to respond to the display element.

7. An end user device for receiving packetized video program content including a smart tag, the end user device comprising:

a processor; and
a non-transitory computer readable storage medium accessible to the processor and including processor executable instructions that, when executed by the processor, cause the processor to perform operations comprising:
receiving tag data from a tag database describing a smart tag corresponding to an element of a video program wherein the element is selected from: an object depicted in the video program and a subject raised in the video program;
receiving video data from a video content server corresponding to the video program;
combining the tag data and the video data to generate program data associated with the video program, the program data including at least one integrated user datagram protocol packet comprising a user datagram protocol header and a payload, wherein the payload includes a compressed video transport packet corresponding to a particular portion of the video program and a smart tag corresponding to a particular element occurring during the particular portion of the video program wherein each integrated user data protocol packet payload containing a smart tag further includes a video transport packet corresponding to a particular portion of the video program to which the smart tag corresponds;
transmitting the program data to a plurality of end users via a packet-switched network; and
responsive to detecting viewer selection of a first smart tag associated with a first element of the video program, launching a browser to browse a web page associated with the first element.

8. The end user device of claim 7, further comprising:
a display device for displaying the first smart tag and the video program to an end user; and
an input device for receiving input from the end user, and wherein the operations include enabling the end user to select the first smart tag using the input device.

9. The end user device of claim 8, wherein the operations include:
halting presentation of the video program in response to the launching of the browser and resuming the video program in response to a closing of the browser.

10. The end user device of claim 9, wherein the first smart tag is associated with an obtainable product appearing in the video program, and wherein the operations include sending an indication of a response by the end user to the displayed indication of the first smart tag.

11. The end user device of claim 10, wherein the indication of the response by the end user is a purchase inquiry for the obtainable product.

12. The end user device of claim 7, wherein the video program includes a commercial advertisement and wherein the first smart tag occurs during the commercial advertisement.

13. The end user device of claim 7, wherein the program data includes user datagram protocol packets.

14. A video presentation method, comprising:
receiving tag data from a tag database describing a smart tag corresponding to an element of a video program wherein the element is selected from: an object depicted in the video program and a subject raised in the video program;

receiving video data from a video content server corresponding to the video program;

combining the tag data and the video data to generate program data associated with the video program, the program data including at least one integrated user datagram protocol packet comprising a user datagram protocol header and a payload, wherein the payload includes a compressed video transport packet corresponding to a particular portion of the video program and a smart tag corresponding to a particular element occurring during the particular portion of the video program wherein each integrated user data protocol packet payload containing a smart tag further includes a video transport packet corresponding to a particular portion of the video program to which the smart tag corresponds;;

transmitting the program data to a plurality of end users via a packet-switched network; and responsive to detecting viewer selection of a first smart tag associated with a first element of the video program, launching a browser to browse a web page associated with the first element.

15. The method of claim 14, further comprising:
displaying the first smart tag and the video program to an end user;
receiving input from the end user via an input device; and
selecting the first smart tag in response to user input detected via the input device.

16. The method of claim 15, further comprising:
halting presentation of the video program in response to the launching of the browser and resuming the video program when the browser is closed.

17. The method of claim 14, wherein the first smart tag is associated with a product appearing in the video program.

18. The method of claim 17, wherein the viewer selection of the first smart tag initiates a purchase inquiry for the product.

19. The method of claim 14, wherein the video program includes a commercial advertisement portion and wherein the first smart tag occurs during the commercial advertisement portion.

20. The method of claim 14, wherein the program data includes a plurality of user datagram protocol packets.

* * * * *